US012323653B2

(12) United States Patent
Li

(10) Patent No.: US 12,323,653 B2

(45) Date of Patent: Jun. 3, 2025

(54) SYSTEM AND METHOD FOR PROVIDING COMMON KEY AMONG MEDIA GATEWAY APPLIANCE SUBSYSTEM

(71) Applicants: ARRIS ENTERPRISES LLC, Suwanee, GA (US); Ju Li, Shenzhen (CN)

(72) Inventor: Ju Li, Shenzhen (CN)

(73) Assignee: ARRIS Enterprises LLC, Horsham, PA (US)

(*) Notice: Subject to any disclaimer, the term of this patent is extended or adjusted under 35 U.S.C. 154(b) by 42 days.

(21) Appl. No.: 18/028,607

(22) PCT Filed: Sep. 29, 2020

(86) PCT No.: PCT/CN2020/118726

§ 371 (c)(1),
(2) Date: Mar. 27, 2023

(87) PCT Pub. No.: WO2022/067473

PCT Pub. Date: Apr. 7, 2022

(65) Prior Publication Data

US 2023/0370675 A1 Nov. 16, 2023

(51) Int. Cl.

| | |
|---|---|
| ***H04N 21/4367*** | (2011.01) |
| ***H04N 21/441*** | (2011.01) |
| ***H04N 21/475*** | (2011.01) |

(52) U.S. Cl.

CPC ....... *H04N 21/4367* (2013.01); *H04N 21/441* (2013.01); *H04N 21/4753* (2013.01)

(58) Field of Classification Search

CPC ............ H04N 21/4367; H04N 21/441; H04N 21/4753

See application file for complete search history.

(56) References Cited

U.S. PATENT DOCUMENTS

| | | | | |
|---|---|---|---|---|
| 2002/0152377 A1 | 10/2002 | Bauman et al. | | |
| 2011/0102676 A1 | 5/2011 | Dai | | |
| 2013/0308470 A1* | 11/2013 | Bevan | H04W 36/322 | 370/252 |

(Continued)

FOREIGN PATENT DOCUMENTS

| | | |
|---|---|---|
| CN | 104540017 A | 4/2015 |
| CN | 105744359 A | 7/2016 |
| CN | 107197373 A | 9/2017 |

OTHER PUBLICATIONS

Notification of Transmittal of the International Search Report and the Written Opinion of the International Searching Authority dated Jun. 25, 2021, in International Application No. PCT/CN2020/118726, 9 pps.

(Continued)

*Primary Examiner* — Sumaiya A Chowdhury

(74) *Attorney, Agent, or Firm* — Panitch Schwarze Belisario & Nadel LLC

(57) ABSTRACT

A system and method for enabling and supporting the use of a shared key code among multiple media gateway appliance subsystems. The system enables a user to specify the particular key code to be utilized, as well as the specific subsystems it will be associated with. The system and method will require a user to enter the shared key code as a prerequisite for accessing certain restricted content, functionality or information.

18 Claims, 8 Drawing Sheets

(56) References Cited

U.S. PATENT DOCUMENTS

| | | | | |
|---|---|---|---|---|
| 2014/0165165 | A1* | 6/2014 | Story, Jr. ........... | H04W 12/0431 726/6 |
| 2014/0289824 | A1 | 9/2014 | Chan et al. | |
| 2018/0285834 | A1 | 10/2018 | Jones et al. | |

OTHER PUBLICATIONS

Extended European Search Report, issued May 23, 2024, in corresponding European ApplicationNo. 20955501.0-1207, 10 pages.

* cited by examiner

SYSTEM AND METHOD FOR PROVIDING COMMON KEY AMONG MEDIA GATEWAY APPLIANCE SUBSYSTEM

BACKGROUND OF THE INVENTION

As the provision of broadband services continues to expand around the globe with more multiservice operators ("MSOs") offering an ever-increasing menu of media and communication options to their residential and business customers. Typically, these broadband services are provided via a cable, optical or satellite broadband connection that links to a media gateway appliance ("MGA") at the residence or business location. The media gateway appliance performs a host of functions including modulation/demodulation, packetizing, tuning, and routing to support and provide bidirectional multimedia communications and services. An example of one type of MGA is a set-top box.

FIG. 1 is an illustration of a prior art system 100, including a typical MGA (102) linked to an MSO headend (104) via a broadband link (106). The broadband link is then connected to two distinct subsystems within MGA 102: a video module (108) and a router module (110). Video module 108 receives, transmits and manages information related to video programming. Such a module includes a processor 112 and a memory 114. Memory 114 is adapted to store information enabling the provision of video content to one or more users; this information could include recorded digital video. Video module 108 would typically be connected to one or more televisions or video displays (116). Router module 110 is adapted to receive, transmit and manage information related to digital communications, including internet traffic and services. Like the video module, router module 110 includes a processor (118) and a memory (120); memory 120 being adapted to store information enabling the provision of digital communication services to one or more users. Router module 110 is connected to wireless network 122 (such as an 802.11 Wi-Fi network) and wired network 124 (such as an Ethernet network) so as to facilitate connection to user terminals and devices (computers, tablets, smartphones, etc.).

Video module 108 and router module 110 each operate as separate and distinct subsystems within MGA 102. Each of the systems utilizing a separate processor and a separate memory. Although the segregation of the video module from the router module architecture enables each of the subsystems to operate independently and can result in improved performance of each of the subsystems, it can also introduce some unwanted inconveniences for users of the MGA.

For example, it is common for MGAs to permit users to restrict access to the video services supported by the video module (108) subsystem. A parent may wish to limit a child's access to content intended for mature audiences, and a business owner may wish to limit access to entertainment content during business hours. Such access is typically restricted by requiring a user to enter a particular video module key code via a user interface such as a handheld remote-control device. The video module key code is usually specified by an authorized user (such as a parent or business owner) and stored in the video module memory (114).

Similarly, a parent or business owner may wish to limit access to digital communications provided via the MGA's router module (110) subsystem; certain content may be unsuitable for children and inappropriate for the workplace. Access to such restricted content would be granted to a user only after provision of a particular router module key code entered via a user interface such as a handheld remote-control device. The router module key code is usually specified by an authorized user (such as a parent or business owner) and stored in router module memory 120.

It can be common practice for a parent or business owner to utilize the same key code for both the video module and router module key code. Unfortunately, even if the same key code is utilized for both the video module and router module subsystems, the parent or business owner must enter it twice. Once so it can be processed (via processor 112) and stored (via memory 114) within the video module, and again so it can be processed (via processor 118) and stored (via memory 120). While the entry of a key code sequence may seem trivial, it can pose a significant inconvenience when it must be entered via handheld remote-control device. Entry of such key codes via remote control devices typically involve an on-screen alpha-numeric menu that must be navigated utilizing directional buttons upon the remote-control device. This can be a tedious, time-consuming and error-prone process.

Consequently, it would be advantageous to provide for a system and method whereby the one-time entry of single key code by a user could be utilized by both the video subsystem and the router subsystem of an MGA.

BRIEF SUMMARY OF THE INVENTION

A system and method for enabling and supporting the use of a shared key code among multiple media gateway appliance subsystems. The system enables a user to specify the particular key code to be utilized, as well as the specific subsystems it will be associated with. The system and method will require a user to enter the shared key code as a prerequisite for accessing certain restricted content, functionality or information.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
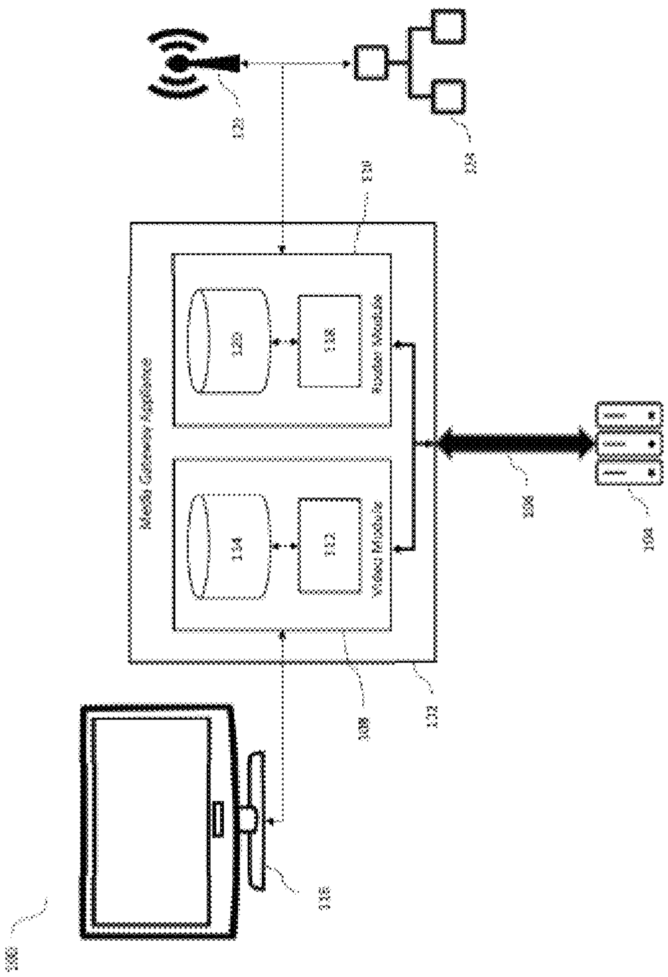
FIG. 1 is a functional block diagram of a system including a prior art media gateway appliance.
Figure 2:
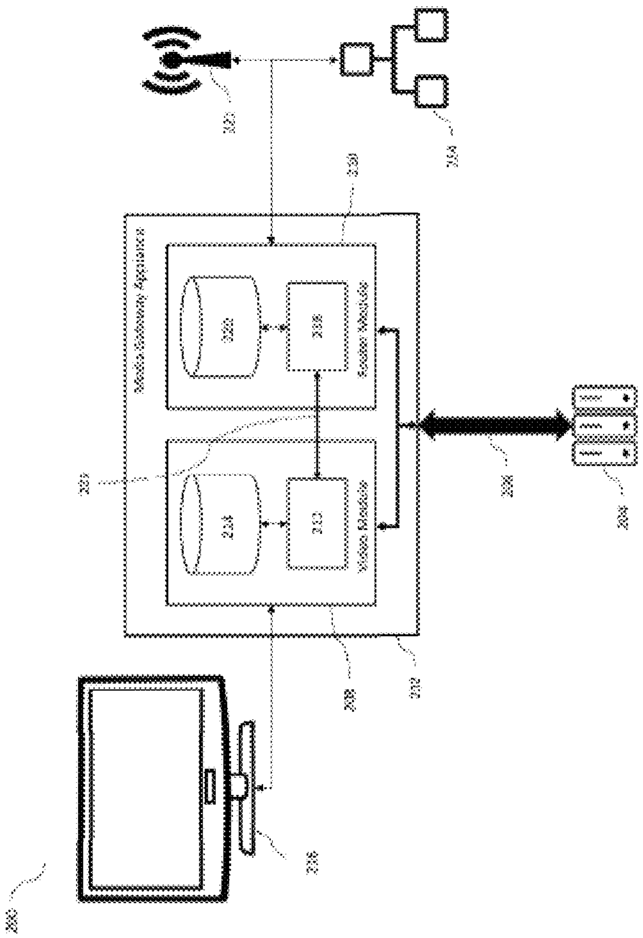
FIG. 2 is a functional block diagram of a first embodiment of a system adapted to enable the use of a common key code among media gateway appliance subsystems.

FIG. 2 is a functional diagram of a first preferred embodiment of a system (200) adapted for the provision of a common key among the video and router subsystems of an MGA. As shown, MGA (202) is linked to MSO headend (204) via a broadband link (206). Broadband link 206 is then connected to two distinct subsystems within MGA 202: video module 208 and router module 210. Video module 208 receives, transmits and manages information related to video programming; the module comprises at least one processor 212 and at least one memory 214. Memory 214 is adapted to store information enabling the provision of video content to one or more users; this information could include recorded digital video. Video module 208 would typically be connected to one or more televisions or video displays (216). Router module 210 is adapted to receive, transmit and manage information related to digital communications, including internet traffic and services. Router module 210 comprises at least one processor (218) and at least one memory (220) that is adapted to store information enabling the provision of digital communication services to one or more users. Router module 210 is connected to wireless network 222 (such as an 802.11 Wi-Fi network) and wired network 224 (such as an Ethernet network) so as to facilitate connection to user terminals and devices (computers, tablets, smartphones, etc.). Processor 212 is also linked to processor 218 via conduit 226. This conduit enables information to be passed between the two processors.

Figure 3:
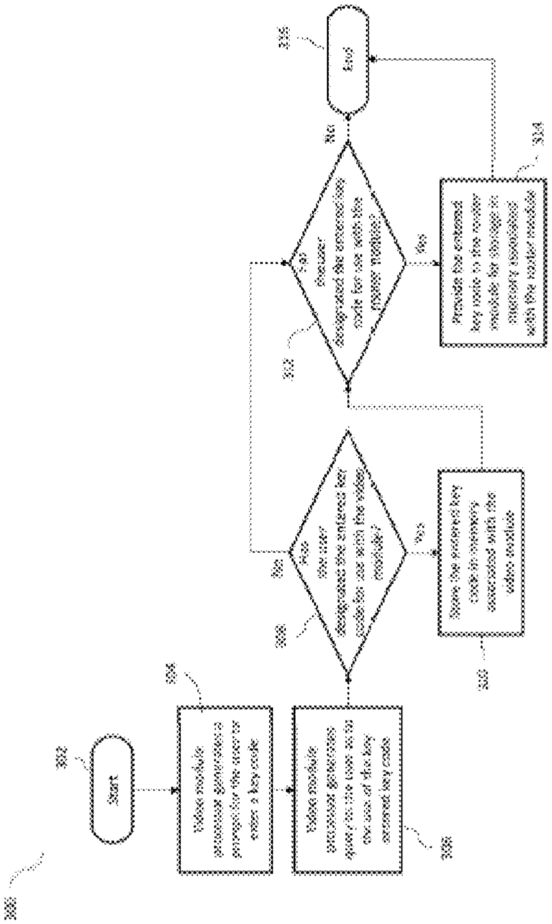
FIG. 3 is a flow diagram of a process supported by the system of FIG. 2.
Figure 4A:
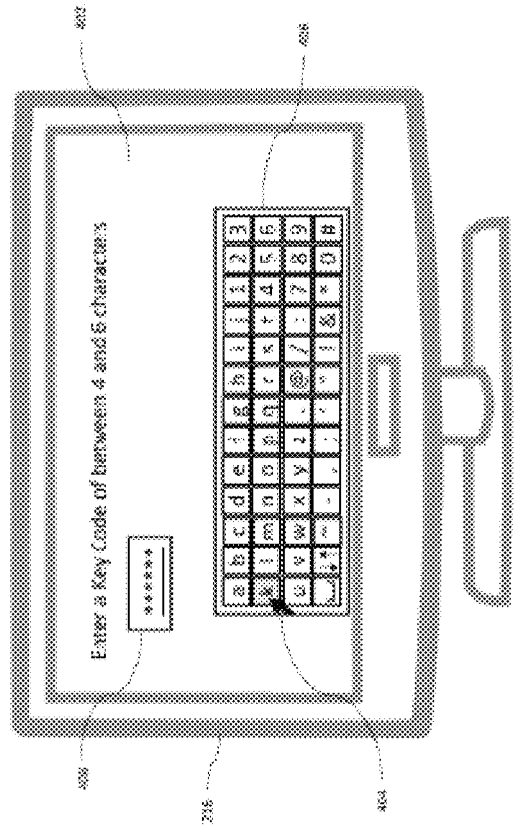
FIG. 4A is a depiction of a user interfaced display adapted to be utilized with the system of FIG. 2, wherein the display is in a first state.
Figure 4B:
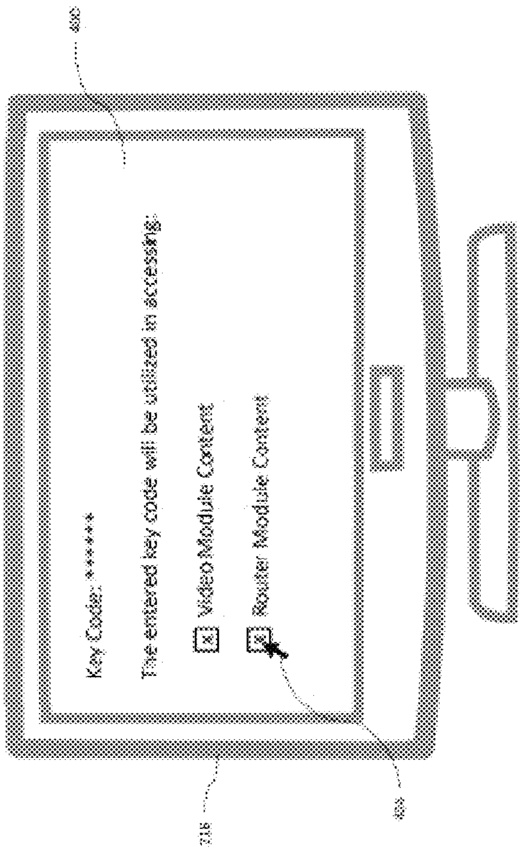
FIG. 4B is a depiction of a user interfaced display adapted to be utilized with the system of FIG. 2, wherein the display is in a second state.

The process executed within system 200 is depicted by the flow diagram of FIG. 3. As shown in steps 302 and 304, video module processor 212 generates a prompt that invites a user to enter a key code that will be used to unlock restrictions placed upon the accessing certain content via MGA 202. The restrictions could be based upon an arbitrary criteria, such as a rating associated with the content or the source of the content (for example, a particular network, provider or creator). The prompt could be provided via any user interface, such as video display 216, or via a tablet, smartphone, computer or other peripheral that was linked to MGA 202 via wireless network 222 and/or wired network 224. An example of one such prompt is provided in FIG. 4A. As shown, was asked to enter a key code of between four and six characters by the prompt of screen 402 of video display 216. This was accomplished by manipulating cursor 402 and selecting individual characters from the virtual alphanumeric keyboard (406). The six characters selected by the user are represented by the six asterisks in key code entry field 408.

The process continues with step 306 wherein video module processor 212 generates a user prompt upon video display 216 that asks the user to designate the type of content the entered key code will be utilized for accessing. As shown the user has employed cursor 404 to designate that the entered key code will be utilized to access both video module content and router module content. Step 308 is next in the process wherein the system determines if the user has indicated that the key code should be used in accessing video module content. If this conditional results in an affirmative outcome, as it would in the above situation where the key code was identified as being utilized for both video and router content, the process continues with step 310. In step 310, the video module processor stores the entered key code in video module memory 214.

Next, in step 312, the system determines if the user has indicated that the key code should be used in accessing router module content. In the present case this conditional would be result in an affirmative outcome, as the key code was identified by the user as being utilized for both video and router content. The process continues with step 314 wherein the video module processor transmits the entered key word to router module processor 218 for storage in router module memory 220. The process ends with step 316.

If at step 308 the conditional had resulted in a negative outcome, the process would have continued with step 312. If in step 312 the conditional had resulted in a negative outcome, the process would have terminated (step 316).

Figure 5:
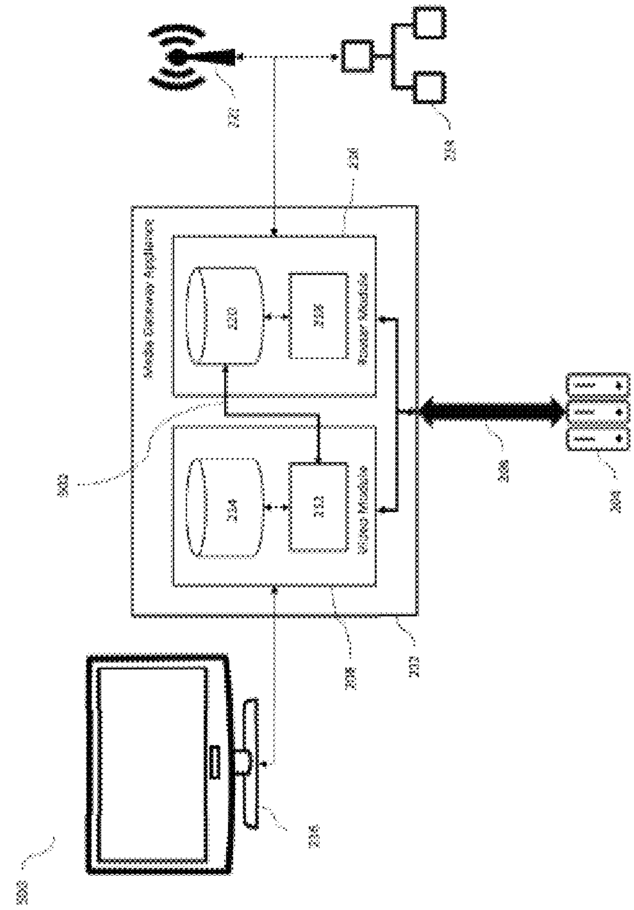
FIG. 5 is a functional block diagram of a second embodiment of a system adapted to enable the use of a common key code among media gateway appliance subsystems.

An alternate preferred embodiment of a system (500) adapted for the provision of a common key among the video and router subsystems of an MGA is shown in FIG. 5. The system is primarily the same as the system depicted in FIG. 2, however, video module processor 212 is linked to router module memory 220 by conduit 502. The system operates in a manner similar to that described above with respect to system 200, with the exception that if step 312 (FIG. 3) results in an affirmative outcome, video module processor 212 stores the user provided keyword directly into router module memory 220.

Figure 6:
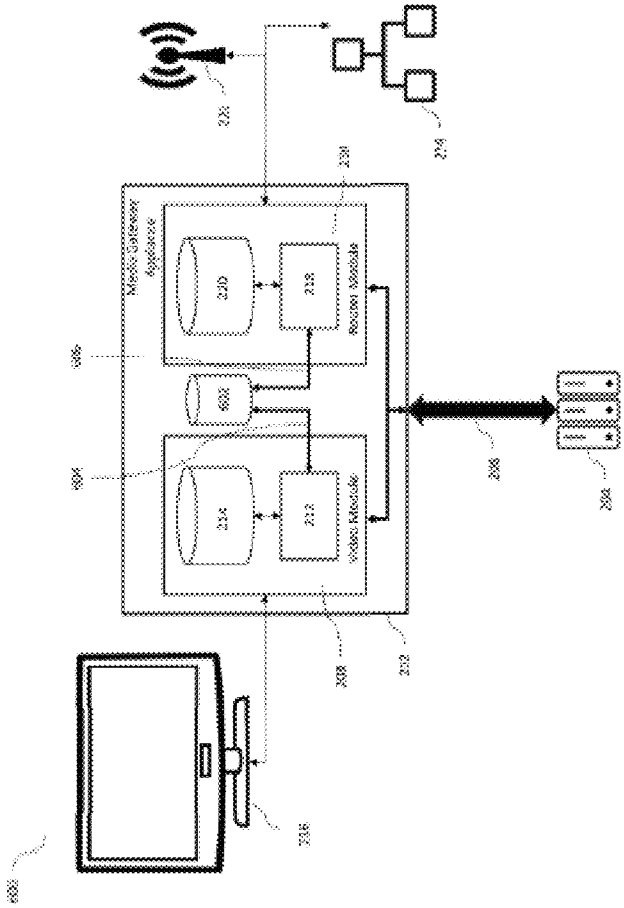
FIG. 6 is a functional block diagram of a third embodiment of a system adapted to enable the use of a common key code among media gateway appliance subsystems.
Figure 7:
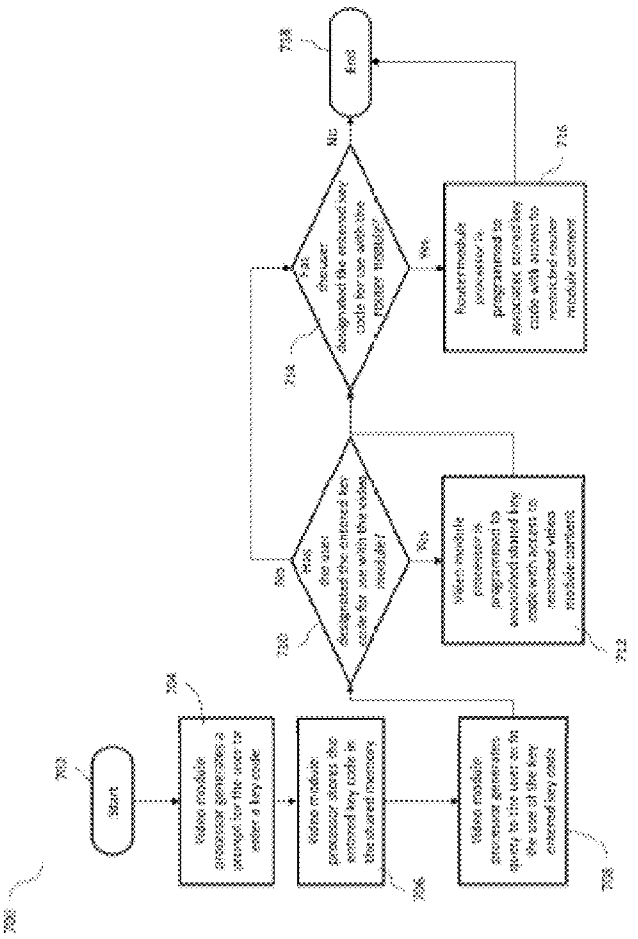
FIG. 7 is a flow diagram of a process supported by the system FIG. 6.

Yet another preferred embodiment of a system adapted for the provision of a common key among the video and router subsystems of an MGA is shown in FIG. 6. System 600 includes common memory 602, as well as conduit 604 (linking video module processor 212 with common memory 602) and conduit 606 (linking router module processor 218 with common memory 602). s primarily the same as the system depicted in FIG. 2, however, video module processor 212 is linked to router module memory 220 by conduit 502. The system operates as depicted in the process flow diagram of FIG. 7.

The process executed within system 600 begins with steps 702 and 704 wherein video module processor 212 generates a prompt that invites a user to enter a key code that will be used to unlock restrictions placed upon the accessing certain content via MGA 202. The process continues with step 706 wherein video module processor stores the user provided key word in shared memory 602. Next, in step 708, video module processor 212 generates a user prompt upon video display 216 that asks the user to designate the type of content the entered key code will be utilized for accessing. Video module processor 212 then determines if the user has indicated that the key code should be used in accessing video module content (step 710). If this conditional results in an affirmative outcome, the process continues with step 712. In this step the location of the stored key code within shared memory 602 is associated with access to restricted video module content to be retrieved or processed by video module 208, and video module processor 212 is instructed to reference that location to determine the key code.

Next, in step 714, the system determines if the user has indicated that the key code should be used in accessing router module content. If so, the process continues with step 716 wherein the location of the stored key code within shared memory 602 is associated with access to restricted router module content to be retrieved or processed by router module 208, and router module processor 218 is instructed to reference that location to determine the key code. The process ends with step 718.

If at step 710 the conditional had resulted in a negative outcome, the process would have continued with step 714. If in step 714 the conditional had resulted in a negative outcome, the process would have terminated (step 718).

Although the invention herein has been described with reference to particular embodiments, it is to be understood that these embodiments are merely illustrative of the principles and applications of the present invention. For example, the stored key code could be utilized to permit access to restricted system functions, user information, financial information, purchasing privileges, etc. controlled by one or more modules within an MGA. In addition, the invention is not limited to application in MGA systems having only two modules, it will be understood that it could be extended to apply to any number of subsystem modules within an MGA. The system is also not limited to embodiments wherein a video module processor serves as the primary processor in performing the steps required to support the disclosed invention. The roles of the video module processor and the router module processor in the above described embodiments could be reversed, with the router module processor performing the processes associated with obtaining and storing a shared key code. Furthermore, any of the links or connections described as being wireless could be accomplished via wired means. The converse holds true for any links or connections described as being wired—They could be accomplished via wireless means without departing from the scope of the disclosed invention. Additionally, the media systems that could be controlled via the disclosed technology are in no way limited to those specifically referenced above, nor are the commands that could be communicated to the media systems limited to those mentioned above. It will also be understood that although the processors and memories depicted in the particular embodiments discussed above were described as being contained within or collocated with an MGA, the processing and storage functionality associated with these components could be provided by remotely located devices, systems or other assets, linked to the MGA via a public or private network. All of the above variations and reasonable extensions therefrom could be implemented and practiced without departing from the spirit and scope of the present invention as defined by the appended claims.

The invention claimed is:

1. A system for enabling use of a shared key code among media gateway appliance subsystems, the system comprising:

at least one user interface;

a media gateway appliance (MGA) configured to communicate with a multiple system operator (MSO) head-end, said MGA including a plurality of media gateway appliance subsystems including at least a video subsystem and a router subsystem, wherein each of the video subsystem and the router subsystem include:

a memory configured to store at least one shared key code; and at least one associated processor configured to store the at least one shared key code in the memory;

wherein at least one of the at least one associated processors within a particular video subsystem and/or router subsystem is configured to:

receive at least one key code;

receive information identifying another media gateway appliance subsystem with which the at least one key code should be associated; and communicate with the identified another media gateway appliance subsystem, via a conduit linked therebetween, to store the received at least one key code in the memory associated with the identified another media gateway appliance subsystem.

2. The system of claim 1, wherein the MGA comprises a set-top box.

3. The system of claim 1, wherein the video subsystem links to a display, and wherein the display provides a user interface.

4. The system of claim 1, wherein the at least one user interface is configured to receive information indicative of the at least one shared key code and transmit the received information to the least one associated processor adapted to store the at least one shared key code.

5. The system of claim 4, wherein the at least one user interface comprises at least one of the following: a television; a computer display; a tablet; a smartphone; and a remote-control device.

6. The system of claim 1, further comprising at least one local network.

7. The system of claim 6, wherein the at least one local network comprises at least one of: a wireless network; and a wired network.

8. The system of claim 7, wherein the at least one local network links the media gateway appliance to the at least one user interface.

9. A system for enabling use of a shared key code among media gateway appliance subsystems, the system comprising:

at least one user interface;

a media gateway appliance (MGA) configured to communicate with a multiple system operator (MSO) head-end, said MGA including a plurality of media gateway appliance subsystems including at least a video subsystem and a router subsystem, wherein the video subsystem and the router subsystem each include at least one associated processor; and a shared memory accessible by each of the at least one associated processor in each of the video subsystem and the router subsystem, wherein at least one of the at least one associated processor associated with a particular video subsystem and/or router subsystem is configured to:

receive at least one key code;

store the received at least one key code in the shared memory;

receive information identifying another media gateway appliance subsystem with which the received at least one key code should be associated; and communicate with the at least one processor associated with the identified another media gateway appliance subsystem, via a conduit linked therebetween, the location of the stored at least one key code.

10. A method for enabling use of a shared key code among media gateway appliance subsystems in a system comprising:

at least one user interface;

a media gateway appliance (MGA) configured to communicate with a multiple system operator (MSO) head-end, said MGA including a plurality of MGA subsystems including at least a video subsystem and a router subsystem, wherein each of the video subsystem and the router subsystem include:

a memory configured to store at least one shared key code; and at least one associated processor configured to store the at least one shared key code in the memory;

the method comprising the steps of:

receiving at least one key code;

receiving information identifying another media gateway appliance subsystem with which the at least one key code should be associated; and communicating with the identified another media gateway appliance subsystem, via a conduit linked therebetween, to store the received at least one key code in the memory associated with the identified another media gateway subsystem.

11. The method of claim 10, wherein the MGA comprises a set-top box.

12. The method of claim 10, wherein the video subsystem links to a display, and wherein the display provides a user interface.

13. The method of claim 10, wherein the at least one key code is received via the at least one user interface.

14. The method of claim 13, wherein the at least one user interface comprises at least one of the following: a television; a computer display; a tablet; a smartphone; and a remote-control device.

15. The method of claim 10, wherein the system further comprises at least one local network.

16. The method of claim 15, wherein the at least one local network comprises at least one of: a wireless network; and a wired network.

17. The method of claim 16, wherein the at least one local network links to the at least one user interface.

18. A method for enabling use of a shared key code among media gateway appliance subsystems, in a system comprising:

at least one user interface;

a media gateway appliance (MGA) configured to communicate with a multiple system operator (MSO) head-end, said MGA including a plurality of MGA subsystems including at least a video subsystem and a router subsystem, wherein each of the video subsystem and the router subsystem include at least one associated processor; and a shared memory accessible by each of the at least one associated processor in each of the video subsystem and the router subsystem, the method comprising the steps of:

receiving at least one key code;

storing the received at least one key code in the shared memory;

receiving information identifying another media gateway appliance subsystem with which the received at least one key code should be associated; and communicating with the at least one associated processor associated with the identified another media gateway appliance subsystem, via a conduit linked therebetween, the location of the stored at least one key code.

* * * * *